(12) United States Patent
Banatwala et al.

(10) Patent No.: US 10,162,904 B2
(45) Date of Patent: *Dec. 25, 2018

(54) CAPTURING AND MANAGING KNOWLEDGE FROM SOCIAL NETWORKING INTERACTIONS

(71) Applicant: International Business Machines Corporation, Armonk, NY (US)

(72) Inventors: Mustansir Banatwala, Hudson, NH (US); David A. Brooks, Arlington, MA (US); Joseph A. Russo, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,432

(22) Filed: Mar. 1, 2017

(65) Prior Publication Data

US 2017/0169106 A1 Jun. 15, 2017

Related U.S. Application Data

(63) Continuation of application No. 14/173,168, filed on Feb. 5, 2014, now Pat. No. 9,652,549.

(51) Int. Cl.
| | |
|---|---|
| *G06F 17/30* | (2006.01) |
| *H04L 29/06* | (2006.01) |
| *G06N 5/02* | (2006.01) |
| *H04L 12/58* | (2006.01) |

(52) U.S. Cl.
CPC .. *G06F 17/30876* (2013.01); *G06F 17/30654* (2013.01); *G06F 17/30705* (2013.01); *G06N 5/02* (2013.01); *G06N 5/022* (2013.01); *H04L 51/32* (2013.01); *H04L 65/403* (2013.01)

(58) Field of Classification Search
CPC ......... G06F 17/30705; G06F 17/30654; G06F 17/30598; G06F 17/30722; H04L 51/32
See application file for complete search history.

(56) References Cited

U.S. PATENT DOCUMENTS

| | | | |
|---|---|---|---|
| 7,676,034 | B1 | 3/2010 | Wu |
| 7,725,492 | B2 | 5/2010 | Sittig |
| 8,185,487 | B2 | 5/2012 | Tuzhilin |

(Continued)

FOREIGN PATENT DOCUMENTS

| | | |
|---|---|---|
| CN | 1766879 A | 5/2006 |
| CN | 101447949 A | 6/2009 |
| CN | 101958848 A | 1/2011 |

OTHER PUBLICATIONS

Wasko et al., Why Should I Share? Examining Social Capital and Knowledge Contribution in electronic networks of practice, Mar. 2005, University of Minnesota, 24 pages.

*Primary Examiner* — Noosha Arjomandi
(74) *Attorney, Agent, or Firm* — Fabian VanCott; Steven L. Nichols

(57) ABSTRACT

Presenting a marking element in a social networking interaction where the marking element includes a question specifier and an answer specifier, creating a knowledge element in response to a user activating the marking element on the social networking interaction or a portion thereof, and presenting a knowledge element indicator in the social networking interaction.

18 Claims, 9 Drawing Sheets

(56) References Cited

U.S. PATENT DOCUMENTS

| | | |
|---|---|---|
| 8,639,650 B1 | 1/2014 | Gill |
| 8,935,192 B1 * | 1/2015 | Ventilla .............. G06N 5/04 |
| | | 706/45 |
| 9,129,259 B2 | 9/2015 | Carriero et al. |
| 9,172,738 B1 | 10/2015 | daCosta |
| 9,436,757 B1 * | 9/2016 | Raynaud ........... G06F 17/30867 |
| 9,652,549 B2 * | 5/2017 | Banatwala .............. G06N 5/02 |
| 9,705,691 B2 | 7/2017 | Tripathi |
| 2004/0220825 A1 | 11/2004 | Schwerin-Wenzel |
| 2005/0229106 A1 | 10/2005 | Labarge |
| 2006/0053196 A1 | 3/2006 | Spataro |
| 2007/0106627 A1 | 5/2007 | Srivastava |
| 2008/0114737 A1 | 5/2008 | Neely |
| 2009/0162824 A1 * | 6/2009 | Heck ...................... G06N 3/004 |
| | | 434/322 |
| 2009/0228441 A1 | 9/2009 | Sandvik |
| 2009/0288150 A1 | 11/2009 | Toomim |
| 2009/0300520 A1 | 12/2009 | Ashutosh |
| 2010/0063797 A1 | 3/2010 | Cong et al. |
| 2011/0125734 A1 | 5/2011 | Duboue |
| 2012/0331390 A1 * | 12/2012 | Kanjirathinkal ....... G06Q 10/10 |
| | | 715/738 |
| 2013/0007037 A1 | 1/2013 | Azzam et al. |
| 2013/0073473 A1 | 3/2013 | Heath |
| 2013/0254305 A1 * | 9/2013 | Cheng .................... H04L 51/32 |
| | | 709/206 |
| 2013/0317808 A1 | 11/2013 | Kruel |
| 2013/0318589 A1 | 11/2013 | Ford |
| 2014/0047560 A1 | 2/2014 | Meyer |
| 2014/0181066 A1 | 6/2014 | Giorcelli |
| 2014/0207794 A1 | 7/2014 | Azzam |
| 2014/0282930 A1 * | 9/2014 | Markwordt ......... G06Q 20/4014 |
| | | 726/5 |
| 2014/0365502 A1 | 12/2014 | Haggar |
| 2015/0127628 A1 * | 5/2015 | Rathod .................. H04W 4/21 |
| | | 707/710 |
| 2015/0220834 A1 | 8/2015 | Banatwala |
| 2015/0363431 A1 | 12/2015 | Fox |
| 2016/0021038 A1 | 1/2016 | Woo |

* cited by examiner

CAPTURING AND MANAGING KNOWLEDGE FROM SOCIAL NETWORKING INTERACTIONS

RELATED APPLICATIONS

The present application is a continuation of and claimed priority under 35 U.S.C. § 120 to U.S. application Ser. No. 14/173,168, filed Feb. 5, 2014, entitled "Capturing and Managing Knowledge from Social Networking Interactions," which is incorporated herein by reference in its entirety.

BACKGROUND

The present disclosure relates to capturing and managing knowledge, and more specifically to capturing and managing knowledge from social networking interactions.

In social networking interactions people can exchange information with each other using computers, mobile phones, and other electronic communication devices. Generally, a social networking user has a group of people with which they share information. For example, a social networking user may have a work group with which they exchange information. The information a user shares with the group may be aggregated in a feed for the group to see. Members of the group may comment on information other users share.

BRIEF SUMMARY

A method for capturing and managing knowledge from social networking interactions includes presenting a marking element in a social networking interaction where the marking element includes a question specifier and an answer specifier, creating a knowledge element in response to a user activating the marking element on the social networking interaction or a portion thereof, and presenting a knowledge element indicator in the social networking interaction.

A system for capturing and managing knowledge from social networking interactions includes a presenting engine to present a marking element in a social networking interaction where the marking element includes a question specifier and an answer specifier, a creating engine to create a knowledge element in response to a user activating the marking element on the social networking interaction or portion thereof, and a storing engine to store the knowledge element in a catalog of knowledge elements.

A computer program product for presenting a link label for multiple hyperlinks includes a tangible computer readable storage medium where the tangible computer readable storage medium has computer readable program code embodied therewith. The computer readable program code has program instructions that, when executed, causes a processor to present a marking element in a social networking interaction where the marking element includes a question specifier and an answer specifier, create a knowledge element in response to a user activating the marking element on the social networking interaction or portion thereof, store the knowledge element in a catalog of knowledge elements, present an evaluation element for evaluating the knowledge element in the social networking interaction, present an editing element for editing the knowledge element, alter the knowledge element in response to a user evaluating or editing the knowledge element, and recommend the knowledge element for use in response to a user composing a message relevant to the knowledge element in the social networking interaction.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
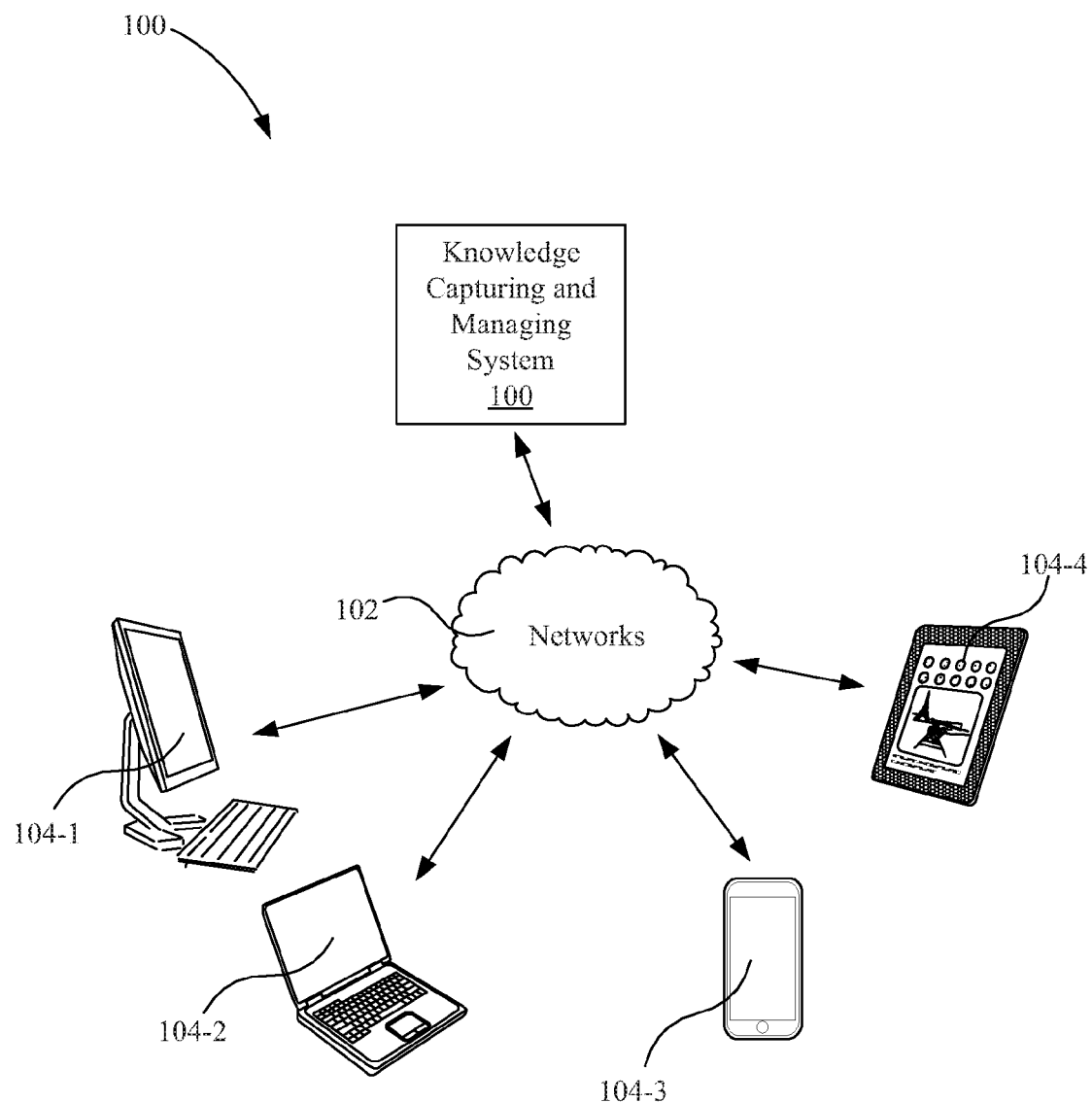
FIG. 1 is a diagram of an example of a knowledge capturing and management system according to the principles described herein.

The present specification describes a method and system for presenting a marking element which includes question and answer specifiers in a social networking interaction, creating a knowledge element in response to a user activating the marking element, and presenting a knowledge element indicator in the social networking interaction such that knowledge from social networking interactions may be captured and managed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As mentioned above, social networking users share information through social networking interactions. In the course of social networking interactions, particularly useful information may be exchanged. However, social networking interactions are not set up to capture and manage knowledge when shared in a social networking interaction. If knowledge from a social networking interaction is not captured and managed, information that may have been useful to users may be lost in the stream of information exchanged. Users who are not engaged in the interaction or do not happen to view the interaction at the time their issue is being discussed may miss this information as well. For example, a manager, in an exchange with his team using a microblog may discover that some members of the team have a common problem with the software they use. It may also be discovered in the course exchanging information that other members of the team have suggestions for solving the problem. The manager may want to have this information captured and managed for later use or else the useful information may be lost.

In some cases, computing systems may be used to attempt to automatically identify information, including question and answers, in a social networking interaction. However, these systems may not prove to be as effective as social networking users themselves at identifying which information is helpful enough to a user to be captured and managed and which information is not. Further, if the computing system looks for questions, helpful information may be lost when a question is inferred but not explicitly stated. In addition, these systems may be prone to making errors in interpreting human language.

The principles described herein include a method for capturing and managing knowledge from social networking interactions. Such a method includes presenting a marking element which includes a question specifier and an answer specifier in a social networking interaction, creating a knowledge element in response to a user activating the marking element on the social networking interaction or a portion thereof and presenting a knowledge element indicator in the social networking interaction.

Thus, the manager may select the information they want captured and manage that information by using the marking element to select that information and specify a part to be a question and a part to be an answer. In response to this information being selected in with the marking element, a knowledge element is produced which may be stored and managed such that the information is made available for future use.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

Referring now to the figures, FIG. 1 is a diagram of an example of a knowledge capturing and management system (100) according to the principles described herein. In this example, the knowledge capturing and management system (100) communicates through a network (102) with various devices (104-1, 104-2, 104-3, and 104-4). A social networking user may compose and post an electronic message in a social networking interaction with a device (104-1, 104-2, 104-3, and 104-4). Other social networking users may receive and comment on the message in the social networking interaction with their devices (104-2, 104-3, and 104-4). If desired, users participating in the social networking interaction may activate a marking element with question and answer specifiers on messages in the social networking interaction with their devices (104-1, 104-2, 104-3, and 104-4) such that knowledge may be captured and managed.

The devices (104-1, 104-2, 104-3, and 104-4) may be any appropriate devices that can send and/or receive electronic messages. For example, a non-exhaustive list of devices that may be suitable includes laptops, desktops, personal computers, phones, electronic tablets, watches, wearable computing devices, personal digital assistants, other electronic devices, and combinations thereof. The electronic message may be a social networking post or comment, a social networking message, a microblog post or comment, another type of message, or combinations thereof. The system used to send the electronic message may be controlled by a network component, such as a server or another network component. In other examples, the electronic message may be controlled locally on the user devices (104-1, 104-2, 104-3, and 104-4).

The knowledge capturing and managing system (100) may provide users participating in the social networking interaction with the capability to activate a marking element, which includes question and answer specifiers, on messages in the social networking interaction. The marking element allows the users to specify which messages in a social networking interaction they want saved for future use. The question and answer specifiers allow the user to specify which message contains a question and pair that question to an answer by specifying a message that contains the answer. Further, multiple messages may be selected as the question and multiple messages may selected as the answer.

In response to the marking element being activated, the capturing and managing system (100) may create a knowledge element. A knowledge element may include information about the portions of the social networking interaction on which the marking element was activated including the question and answer pair. A knowledge element may also include information about the social networking users participating in the social networking interaction. Information included in a knowledge element may further include, but is not limited to, message text, comment text, a number of submitter names, a submission date, a number of categories, a rating, notes, an updated date, other metadata, or a combination thereof. Further, the knowledge element may be stored in a catalog of knowledge elements for later use.

The knowledge capturing and managing system (100) may also present a knowledge element indicator in a social networking interaction. For example, a pair of messages in a social networking interaction has been marked by a social networking user as a question and an answer. The knowledge element indicator indicates which messages were marked so that the participants in the social networking interaction may see that someone found the pair useful. The knowledge element indicator may further provide social networking users with the capability of accessing some or all of the information stored by the knowledge element. Accessing the knowledge element may provide users participating in the social networking interaction with the capability to edit or evaluate a knowledge element.

In response to users' actions, the capturing and managing system (100) may alter the knowledge element including categorizing, clarifying, formatting, editing, or rating the knowledge element.

Further, the capturing and managing system (100) may present recommended completions in response to users composing a message relevant to the knowledge element in the social networking interaction. As the user types a question or answer, a number of relevant knowledge elements may be made available from which the user to may choose. In addition, the user may give feedback about or directly the recommendations so that they may be improved.

Figure 2:
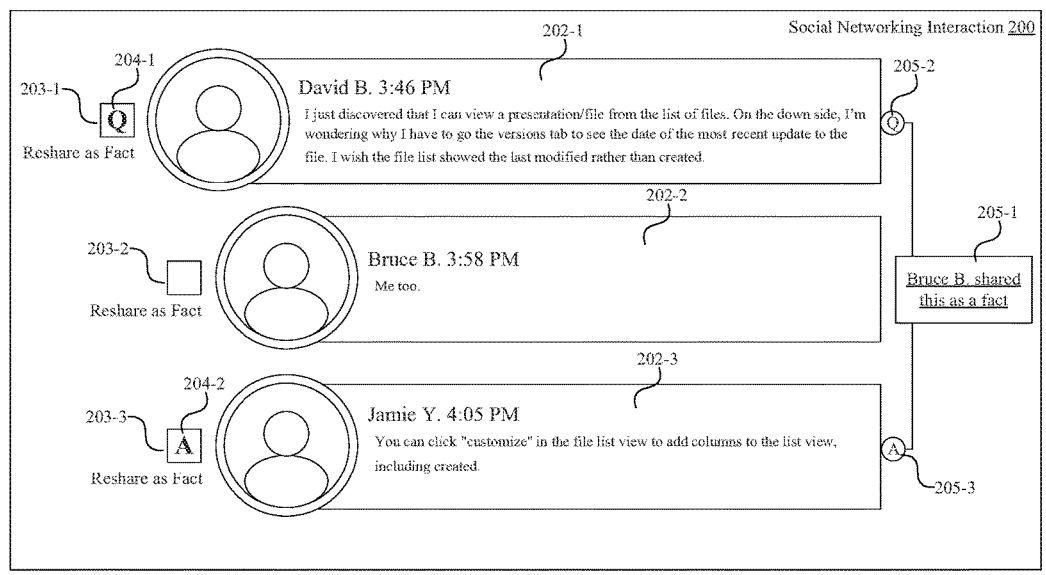
FIG. 2 is a diagram of an example of a marking element with question and answer specifiers and a knowledge element indicator element according to the principles described herein.

FIG. 2 is a diagram of an example of a marking element (203-1, 203-2, and 203-3) with question and answer specifiers (204-1 and 204-2) and a knowledge element indicator (205-1, 205-2, and 205-3). In this example, a social networking user, David B. has posted a message (202-1) to a social networking interaction (200). David B.'s message has received reply messages or comments from Bruce B. (201-2) and Jamie Y. (202-3). David B. shares something he learned about a file viewer and expresses a desire for further functionality for the file viewer (202-1). Bruce B. agrees with the David B's desire for further functionality (202-2). Jamie Y. answers David B's implicit question by telling him how to use the file viewer to achieve his desired result (202-3).

Each message (202-1, 202-2, and 202-3) is presented with a marking element (203-1, 203-2, and 203-3). In this example, the marking element is a visual user interface element that allows a user to mark the element with a question or answer specifier. In other examples, the marking element may include but is not limited to user interface controls, buttons, fields, voice-activated elements, audio elements, or a combination thereof.

Two of the marking elements (203-1 and 203-3) are marked with specifiers. The marking element (203-1) for David B's message (202-1) is marked with a question specifier (204-1) "Q." The marking element (203-3) for Jamie Y's message (202-3) is marked with an answer specifier (204-2) "A." These specifier marks indicate that a user found David B's message (202-1) to include a question and Jamie Y's message (202-3) to include a suitable answer to David B's question.

Upon activating the marking element, a knowledge element is created. In this example, the knowledge element created includes the name of the person who marked the question and answer pair as well as the question and answer pair themselves. To indicate that a knowledge element exists for this social networking interaction (200), a knowledge element indicator (205-1, 205-2, and 205-3) is presented in the social networking interaction. In this example, the knowledge element indicator has three parts: A submitter indicator (205-1), a question indicator (205-2), and an answer indicator (205-3). The submitter indicator presents the name of the user who marked the messages as a question and answer pair. In this example, Bruce B. is shown as being the submitter. Bruce B. participated in the social networking interaction as the submitter; however, the submitter may be any user that is able to view the social networking interaction. A user is not required to participate in the interaction in order to mark it. Further, in this example, the submitter indicator shows the name of one person. However, multiple users may mark the same messages. The question indicator (205-2) indicates which message includes a question. The answer indicator (205-3) indicates which message includes an answer. In general, a knowledge element indicator may represent any of the data included in the knowledge element.

Figure 3:
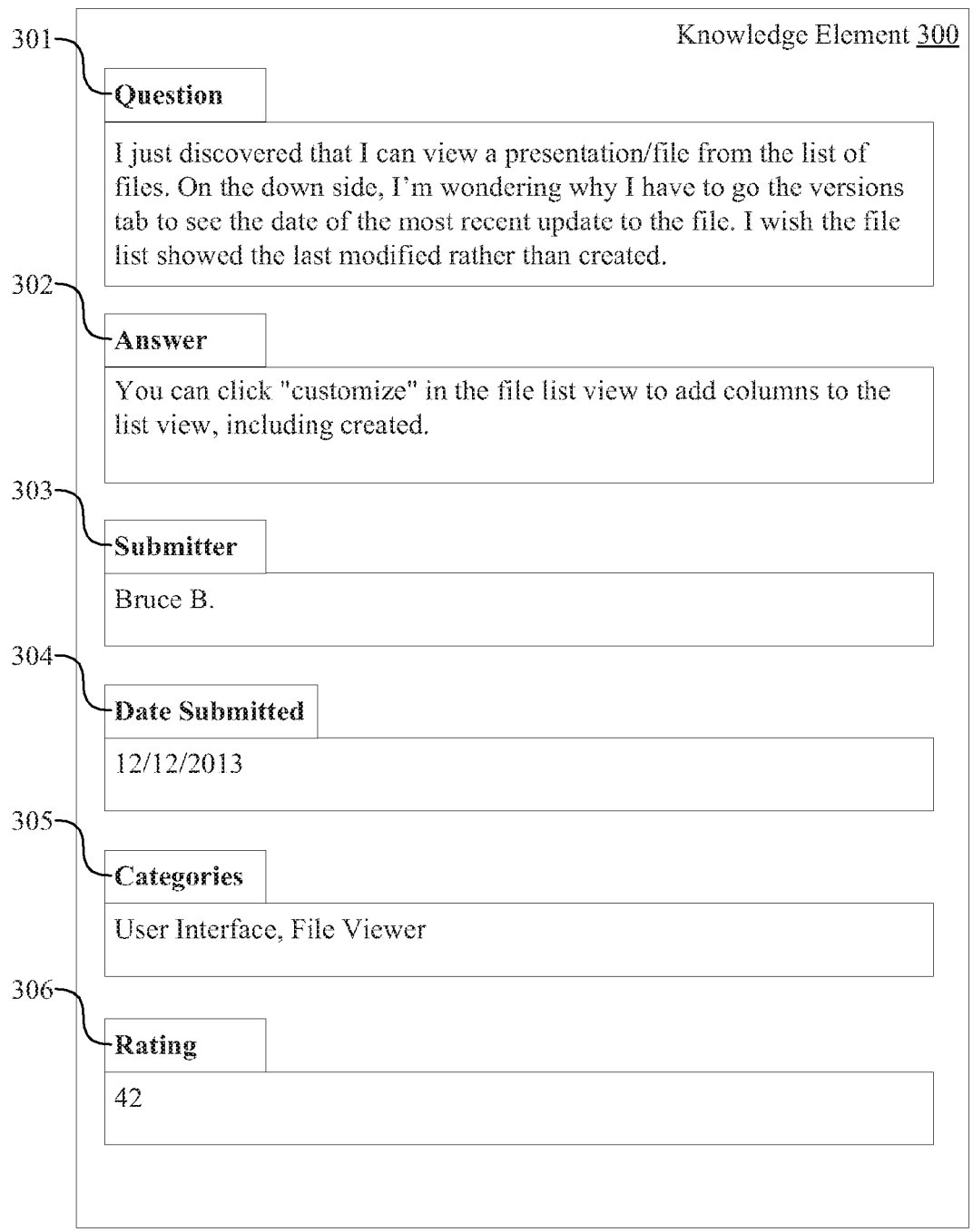
FIG. 3 is a diagram of an example of a knowledge element according to the principles described herein.

FIG. 3 is a diagram of an example of a knowledge element (300). The knowledge element may be used to manage knowledge marked by users of social networking interactions. In this example, the knowledge element (300) includes a question (301), an answer (302), a submitter (303), a date submitted (304), categories (305), and a rating (306).

The question (301) and answer (302) are messages marked by a submitter. In this example, the messages are unedited copies of messages from a social networking interaction. In other examples, the messages may have been edited by the submitter or other users of a capturing and managing system. In this example, the message text itself is stored in the knowledge element. In other examples, however, a pointer or reference to the messages may be used.

The submitter (303) includes the user who marked the knowledge element. In this example, there is one submitter, but in other implementations, many users may be listed as submitters. The date submitted (304) is also included. The date submitted indicates the date on which the submitter marked the messages.

Categories (305) may also be included in the knowledge element to help users to better navigate and classify knowledge elements. For example, in some implementations a knowledge element may be put into a catalog of knowledge elements. When knowledge elements are cataloged, categories may be useful far organizing knowledge elements. Knowledge elements may be given a category chosen by users or by inferring the category through an analysis or other methods of determining a category. Further, knowledge elements may be recommended to users based on a knowledge element's category.

The rating (306) may be managed by a knowledge element as well. A knowledge element's rating may be used to help gauge how useful or effective a knowledge element is. The rating may be affected by users voting on the knowledge element, or by the number of times the knowledge element has been referenced, etc.

Figure 4:
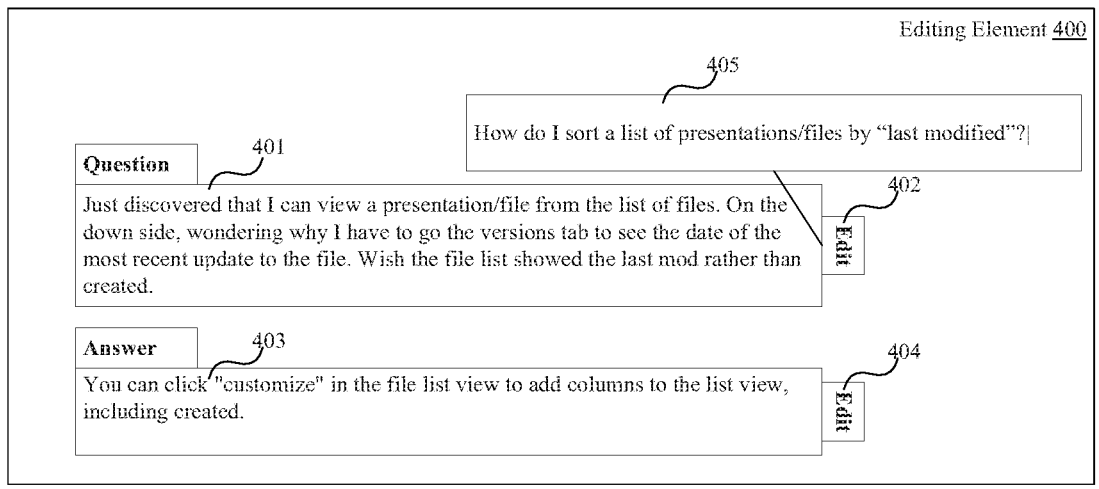
FIG. 4 is an example of an editing element according to the principles described herein.

FIG. 4 is an example of an editing element (400). The editing element (400) may provide users with the capability of editing a knowledge element. In this example, the editing element includes fields that may be edited which include a question (401) and an answer (403); the editing also includes edit buttons (402 and 404), and an editing field (405).

In this example, the question (401) is inferred rather than explicit. A user may desire to clarify the question by editing it to retain the original question but put make it more understandable. The user activates the edit button for the question field (402) and an editing field is presented (405). In the editing field (405) the user enters a clarifying edit of the question and saves it. The knowledge element is updated with the new text. In this example, a visual interface is used, but in general many types of interface could be used, for example, an audio interface, a mobile phone touch interface, a keyboard interface, a mouse interface, a mind-computer interface, or a combination thereof. Although the question field is edited in this example, any data of the knowledge element may be edited if desired.

Figure 5:
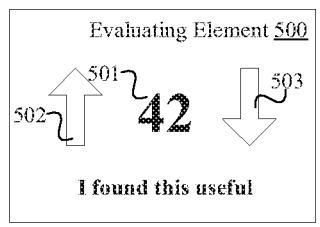
FIG. 5 is an example of an evaluating element according to the principles described herein.

FIG. 5 is an example of an evaluating element (500). The evaluating element (500) may be presented to a user when they view a knowledge element. The evaluating element (500) may also be presented when a knowledge element is recommended to a user. In this example, the evaluating element (500) includes a rating (501), and vote up button (502) and vote down button (503). If a user finds a certain knowledge element useful, the user may increase the rating (501) by using the vote up button (502). If the user does not find the knowledge element useful, they may use the decrease button (501) to decrease the rating.

Figure 6:
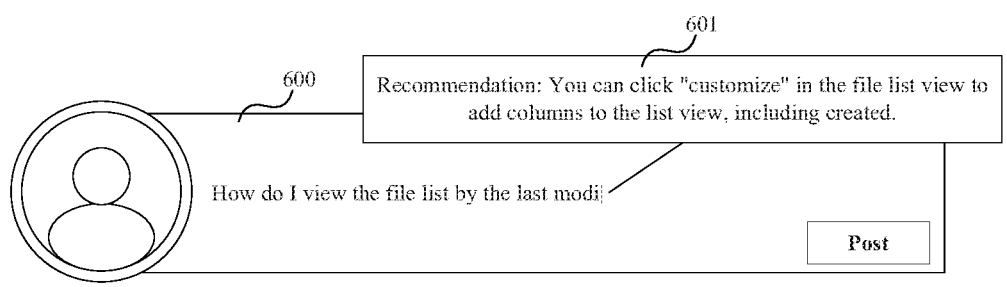
FIG. 6 shows an example of recommending a knowledge element according to the principles described herein.

FIG. 6 shows an example of recommending a knowledge element. In this example, a social networking interaction user is composing a message (600). As the message is composed, the social networking interaction user is given a recommendation (601) based on the text the user has previously entered into the message field. The recommendation may help the user to resolve their question before they share it with their social network. In other implementations, a user may be composing the answer to another user's question and may be recommended a knowledge element to use for the answer.

Figure 7:
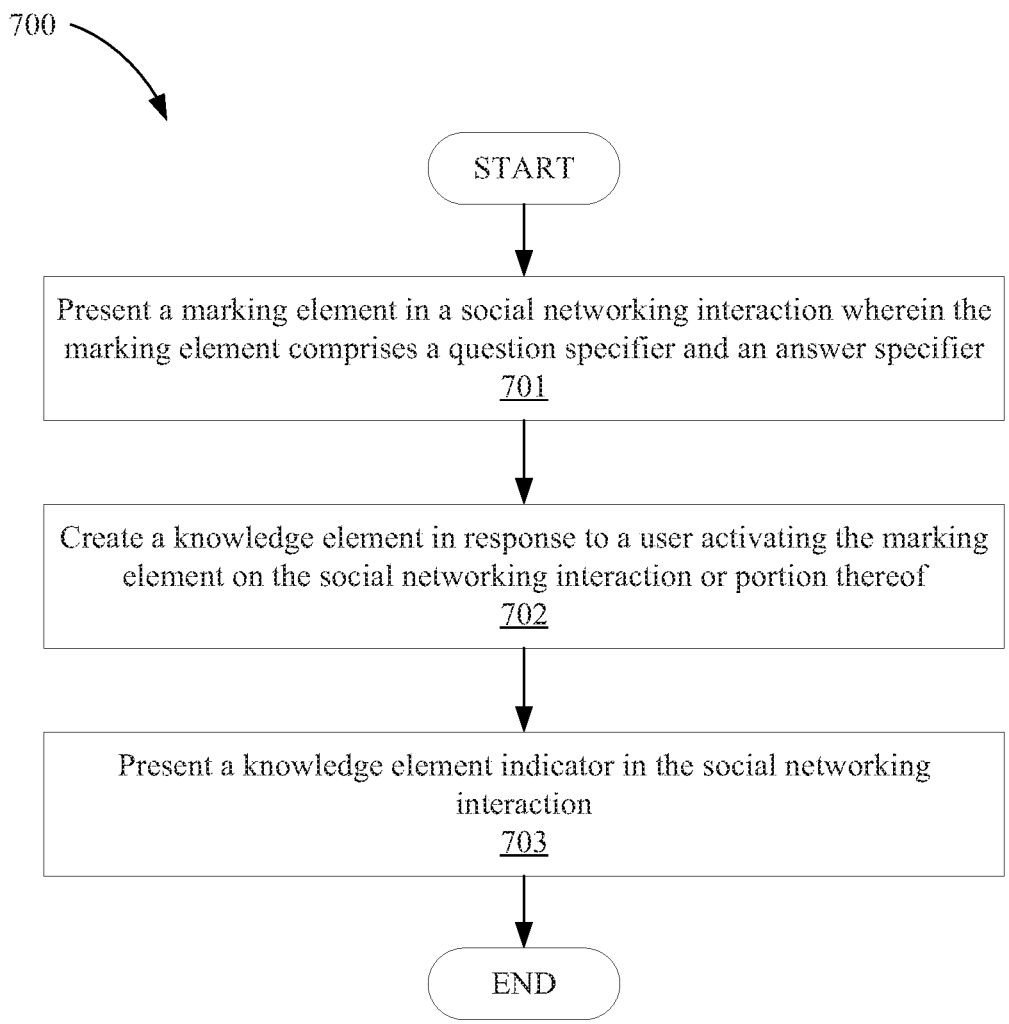
FIG. 7 is a diagram of an example of a method for capturing and managing knowledge from social networking interactions according to the principles described herein.

FIG. 7 is a diagram of an example of a method (700) for capturing and managing knowledge from social networking interactions. In this example, the method (700) includes presenting a marking element in a social networking interaction where the marking element includes a question specifier and an answer specifier (701), creating a knowledge element in response to a user activating the marking element on the social networking interaction or a portion thereof (702), and presenting a knowledge element indicator in the social networking interaction (703).

The marking element may include user interface elements, icons, buttons, images, check boxes, text fields, voice-activated fields, gestures recognizers, or a combination thereof. Some example of a user activating the marking element may include: clicking, typing, selecting, tapping, gesturing, speaking, or a combination thereof. The marking element includes question and answer specifiers so that a user may mark a social networking interaction or portion thereof as the question and a social networking interaction or portion thereof as the answer. Specifiers may include icons, marks in check boxes, entries in text fields, buttons, or a combination thereof. Social networking interactions may include microblogs, message streams, chat rooms, blog posts, forum posts, social network status, comments, other interactions, or a combination thereof.

A knowledge element may include a database table, database fields, and other data structures or a combination thereof. A knowledge element may store, a question and answer pair, date create, submitter, categories, ratings, other metadata or a combination thereof. Creating a knowledge element may include creating a database table or entry, storing data, referencing data, creating other data structures or other methods of persisting data, or a combination thereof.

A knowledge element indicator may include interface elements, images, text, icons, buttons, other interface elements, or a combination thereof. The knowledge element indicator may accompany the relevant messages in a social networking interaction or may be presented in a list as a part of the interaction, other methods of presentation, or a combination thereof.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

Figure 8:
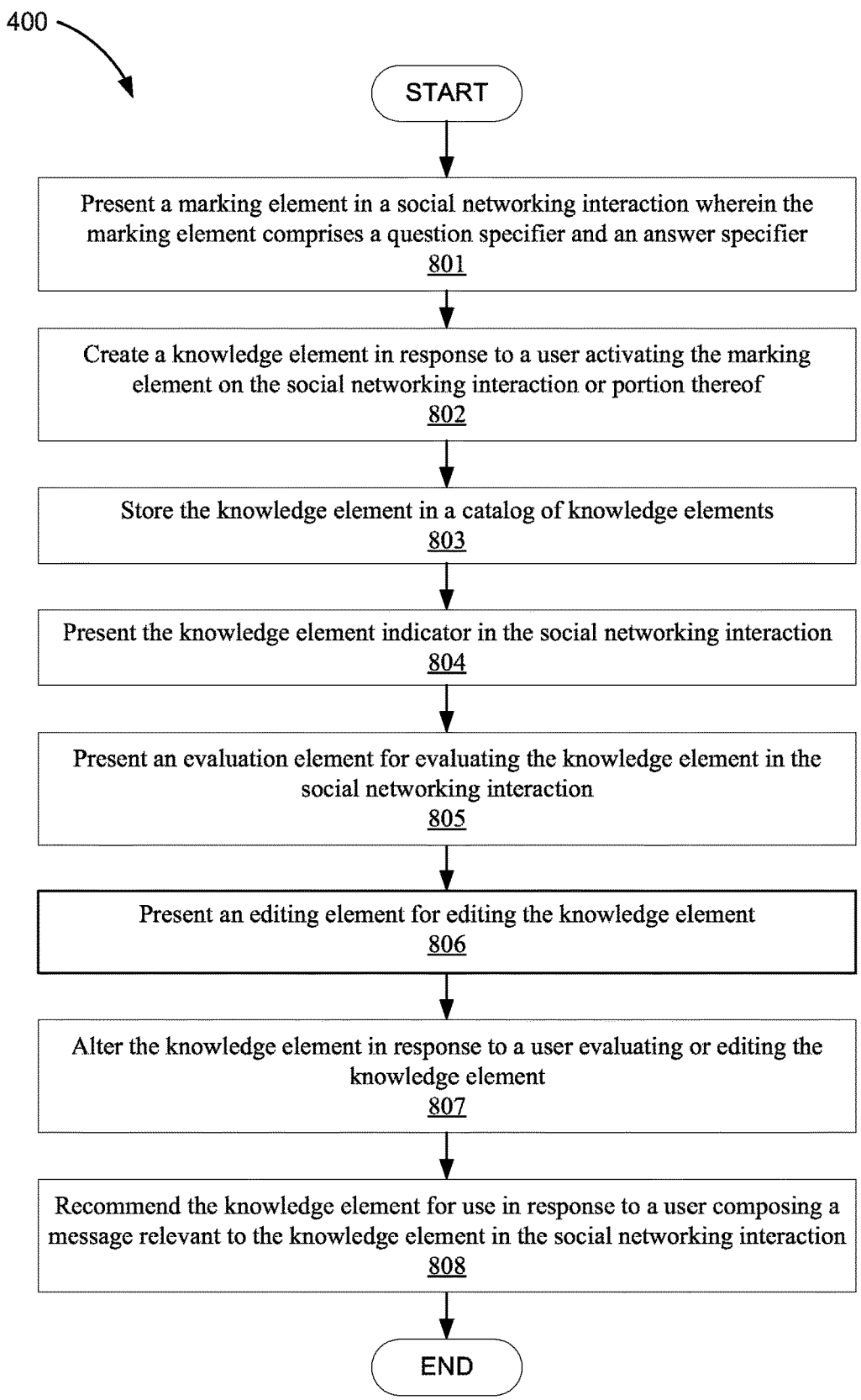
FIG. 8 is a diagram of an example of a method for capturing and managing knowledge from social networking interactions according to the principles described herein.

FIG. 8 is a diagram of an example of a method (800) for capturing and managing knowledge from social networking interactions. In this example, the method (800) includes presenting a marking element in a social networking interaction where the marking element includes a question specifier and an answer specifier (801), creating a knowledge element in response to a user activating the marking element on the social networking interaction or a portion thereof (802), storing the knowledge element in a catalog of knowledge elements (803), presenting a knowledge element indicator in the social networking interaction (804), presenting an evaluation element for evaluating the knowledge element in the social networking interaction (805), presenting an editing element for editing the knowledge element (806), altering the knowledge element in response to a user evaluating or editing the knowledge element (807), and recommending the knowledge element for use in response to a user composing a message relevant to the knowledge element in the social networking interaction (808).

Storing the knowledge element in a catalog of knowledge elements (803) may include categorizing the knowledge element, writing the knowledge element to a persistent memory location, storing the knowledge element on a server, tracking the knowledge element in a relational database or other databases, other storing methods, or a combination thereof. A catalog of knowledge elements may include other knowledge elements that have been created in response to a user activating a marking element on social networking interactions or a portion thereof.

An evaluation element may include user interface elements, buttons, images, icons, text fields, voice-activated fields, other interface elements, or a combination thereof. Evaluating a knowledge element may include rating a knowledge element based on a variety of factors.

Altering the knowledge element in response to a user evaluating or editing the knowledge element (807) may include altering the knowledge element based a user's input into the evaluating and editing elements. For example, if a user desires to increase the rating a of a knowledge element they may use the evaluating element to indicate their desire. The capturing and managing system, in response, alters the knowledge element. Further, the knowledge element may be altered by categorizing, clarifying, formatting, editing, rating or combinations thereof. These alterations may be made by users, administrators, performed programmatically, or a combination thereof.

Recommending the knowledge element for use in response to a user composing a message relevant to the knowledge element in the social networking interaction (808) may include detecting that a user is composing a question and recommending a knowledge element which may include an answer, detecting that a user is entering an answer to a question and recommending an answer based on knowledge elements that have similar questions, etc. Recommending may include presenting a knowledge element indicator to the social networking interaction user, alerting the user, displaying user interface elements to the user including and images, other ways of recommending, or combinations thereof.

Figure 9:
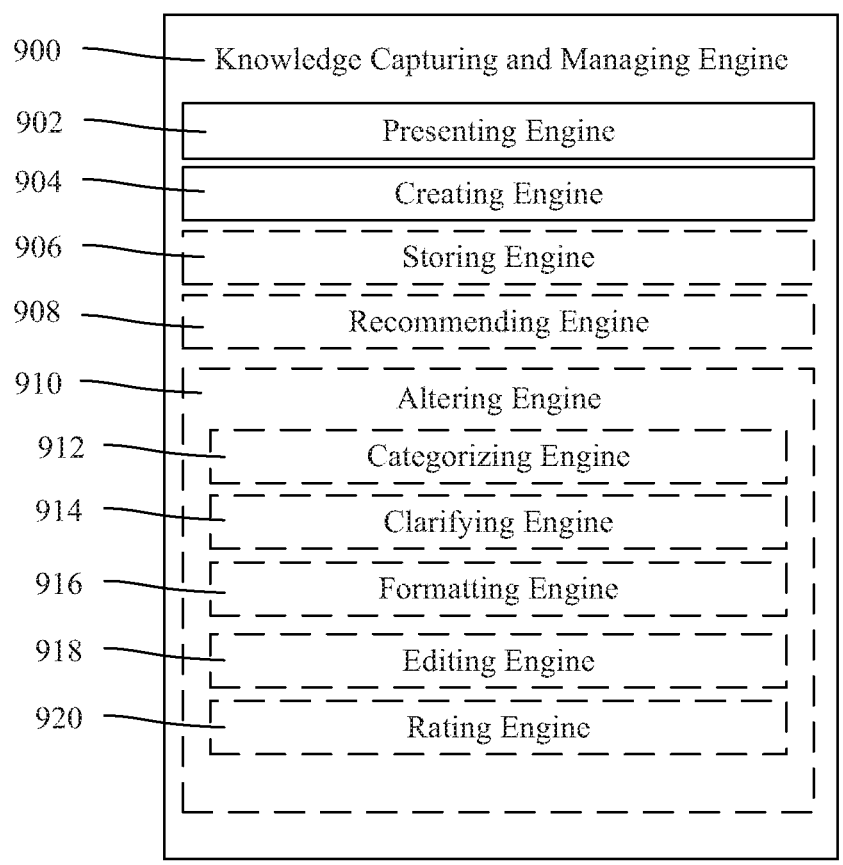
FIG. 9 is a diagram of an example of a knowledge capturing and managing system according to the principles described herein.

FIG. 9 is a diagram of an example of a knowledge capturing and managing system (900). The knowledge capturing and managing system (900) includes a presenting engine (902) and a creating engine (904). In this example, the knowledge capturing and managing system also includes a storing engine (906), a recommending engine (908), and an altering engine (910). The altering engine (910) further includes a categorizing engine (912), a clarifying engine (914), a formatting engine (916), an editing engine (918), and a rating engine (920). The engines (902, 904, 906, 908, 910, 912, 914, 916, 918, 920) refer to a combination of hardware and program instructions to perform a designated function. Each of the engines (902, 904, 906, 908, 910, 912, 914, 916, 918, 920) may include a processor and memory. The program instructions are stored in the memory and cause the processor to execute the designated function of the engine.

The presenting engine (902) presents marking elements with question and answer specifiers in a social networking interaction. In this example, the presenting engine may include several presenting engines or may be one presenting engine which may further present a knowledge element indicator, an evaluation element, and an editing element.

The creating engine (904) creates a knowledge element in response to a user activating the marking element. The creating engine may include in the knowledge element the question and answer marked or a reference thereto and other metadata about the knowledge element.

The storing engine (906) stores the knowledge element in a catalog. Once stored in a catalog the recommending engine (908) may use the cataloged knowledge elements to recommend answers to questions composed by social networking interaction users. In addition, the altering engine (910) may, through user input or programmatically, alter the knowledge element. The altering engine includes a categorizing engine (912), a clarifying engine (914), a formatting engine (916), an editing engine (918), and a rating engine (920) for this purpose. Knowledge elements may be categorized, clarified, formatted, edited, or rated with these engines.

Figure 10:
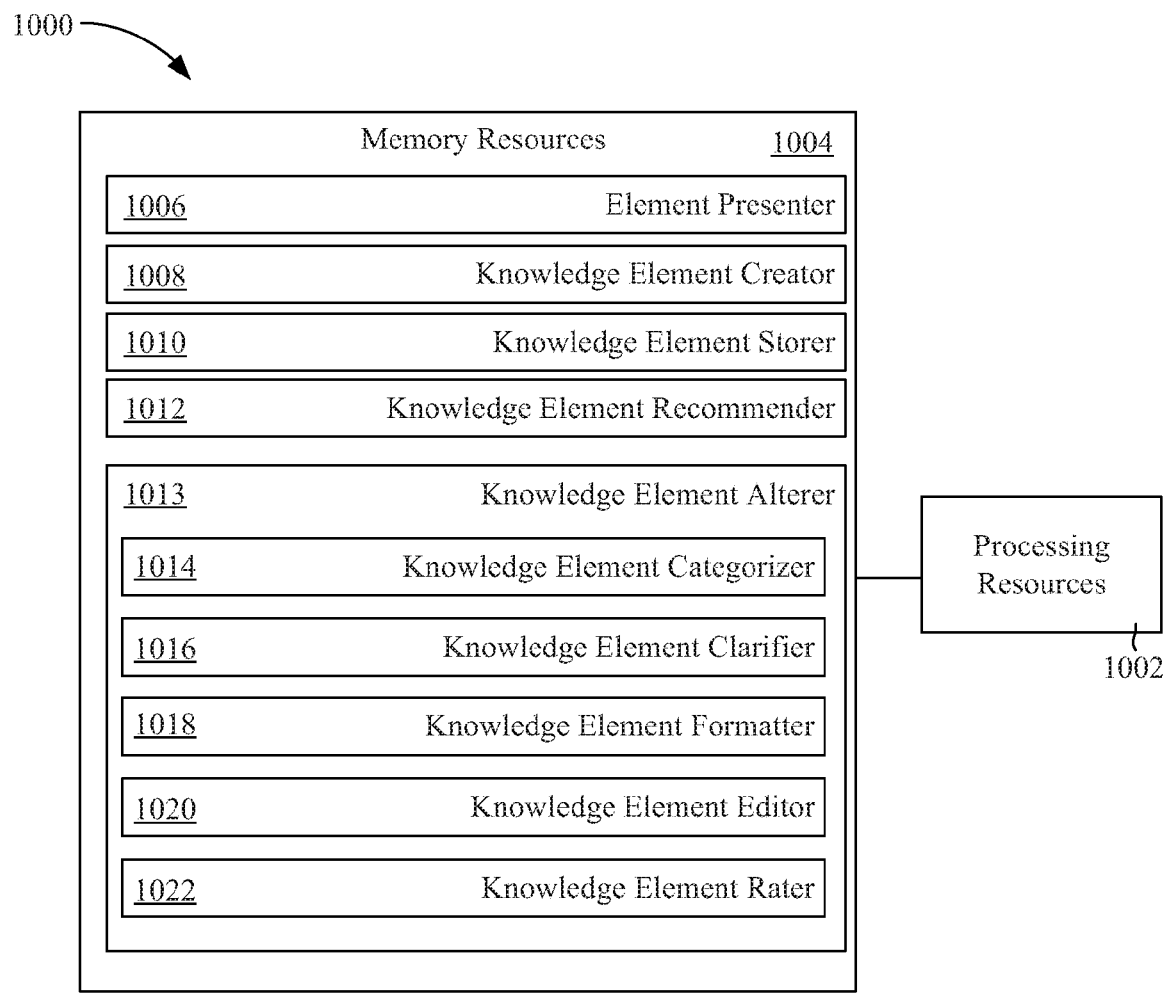
FIG. 10 is a diagram of an example of a knowledge capturing and managing system according to the principles described herein.

FIG. 10 is a diagram of an example of a knowledge capturing and managing system. In this example, the knowledge capturing and managing system (1000) includes processing resources (1002) that are in communication with memory resources (1004). Processing resources (1002) include at least one processor and other resources used to process programmed instructions. The memory resources (1004) represent generally any memory capable of storing data such as programmed instructions or data structures used by the knowledge capturing and managing system (1000).

The programmed instructions shown stored in the memory resources (1004) include an element presenter (1006), a knowledge element creator (1008), a knowledge element storer (1010), a knowledge element recommender (1012), a knowledge element alterer (1013), which knowledge element alterer (1013) further includes a knowledge element categorizer (1014), a knowledge element clarifier (1016), a knowledge element formatter (1018), a knowledge element editor (1020), and a knowledge element rater (1022).

The memory resources (1004) include a computer readable storage medium that contains computer readable program code to cause tasks to be executed by the processing resources (1002). The computer readable storage medium may be tangible storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, magnetic storage media, other types of memory, or combinations thereof.

The element presenter (1006) may be one presenter or multiple presenters which represent programmed instructions that, when executed, cause the processing resources (1002) to present a marking element with question and answer specifiers, to present an evaluation element for evaluating knowledge elements, to present an editing element for evaluating knowledge elements, and to present a knowledge element indicator.

The knowledge element creator (1008) represents programmed instructions that, when executed, cause the processing resources (1002) to create a knowledge element which may be stored in a catalog by the knowledge element storer (1010). The knowledge element storer (1010) represents programmed instructions that, when executed, cause the processing resources (1002) to store a knowledge element in a catalog. The knowledge element recommender (1012) represents programmed instructions that, when executed, cause the processing resources (1002) to recommend the knowledge element for use in response to a user composing a message relevant to the knowledge element in the social networking interaction.

The knowledge element alterer (1013) represents programmed instructions that, when executed, cause the processing resources (1002) to alter the knowledge element in a variety of ways in response to a user evaluating or editing the knowledge element. The knowledge element alterer (1013) includes: a knowledge element categorizer (1014) which represents programmed instructions that, when executed, cause the processing resources (1002) to categorize the knowledge element; a knowledge element clarifier (1016) which represents programmed instructions that, when executed, cause the processing resources (1002) to clarify the knowledge element; a knowledge element formatter (1018) which represents programmed instructions that, when executed, cause the processing resources (1002) to format a knowledge element; a knowledge element editor (1020) which represents programmed instructions that, when executed, cause the processing resources (1002) to edit a knowledge element; and a knowledge element rater (1022) which represents programmed instructions that, when executed, cause the processing resources (1002) to rate a knowledge element.

Further, the memory resources (1004) may be part of an installation package. In response to installing the installation package, the programmed instructions of the memory resources (1004) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (1002) and the memory resources (1004) are located within the same physical component, such as a server, or a network component. The memory resources (1004) may be part of the physical component's main memory, caches, registers, non-volatile memory, or elsewhere in the physical component's memory hierarchy. Alternatively, the memory resources (1004) may be in communication with the processing resources (1002) over a network. Further, the data structures, such as the libraries and may be accessed from a remote location over a network connection while the programmed instructions are located locally. Thus, the knowledge capturing and managing system (1000) may be implemented on a user device, on a server, on a collection of servers, or combinations thereof.

The knowledge capturing and managing system (1000) of FIG. 10 may be part of a general purpose computer. In alternative examples, the knowledge capturing and managing system (1000) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computer program product for capturing and managing knowledge from social networking interactions comprising:
   a non-transitory computer readable storage medium, said computer readable storage medium comprising computer readable program code embodied therewith, said computer readable program code comprising program instructions that, when executed, causes a processor to:
   present a marking element in a social networking interaction, wherein said marking element allows a user to specify whether a corresponding message corresponds to at least one member of a group consisting of a question and an answer;
   receive a first user selection indicating a portion of said social network interaction as a question;
   receive a second user selection indicating a portion of said social networking interaction as an answer;
   create a knowledge element in response to a user activating said marking element in said social networking interaction;
   populate the knowledge element with information about:
     the portion of the social networking interaction indicated as a question; and
     the portion of the social networking interaction indicated as an answer;
   store said knowledge element in a catalog of knowledge elements;
   present an evaluation element for evaluating said knowledge element in said social networking interaction;

present an editing element for editing said knowledge element;

present knowledge element indicators to accompany said corresponding messages, which knowledge element indicators indicate whether corresponding messages correspond to at least one of a group consisting of a question and an answer;

provide access to information associated with the knowledge element via the knowledge element indicators; and alter said knowledge element in response to a user evaluating or editing said knowledge element.

2. The computer program product of claim 1, further comprising program instructions that, when executed, cause said processor to categorize said knowledge element.

3. The computer program product of claim 1, further comprising program instructions that, when executed, cause said processor to track said knowledge element in a relational database.

4. The computer program product of claim 1, wherein indicating a portion of said social networking interaction as an answer comprises pairing said answer to said question.

5. The computer program product of claim 1, further comprising program instructions that, when executed, causes said processor to recommend said knowledge element for use responsive to a user composing a message relevant to said knowledge element in said social networking interaction before said user shares said message within said social networking interaction.

6. A system for capturing and managing knowledge from social networking interactions comprising:

a presenting engine, comprising memory, to:

present a number of marking elements in a social networking interaction, wherein said marking elements allow a user to specify whether a message corresponding to at least one of said marking elements corresponds to at least one member of a group consisting of a question and an answer;

receive user indication via the at least one of said marking elements that a corresponding message corresponds to at least one member of the group consisting of a question and an answer; and present a knowledge element indicator to accompany a corresponding message, which knowledge element indicator indicates whether corresponding messages correspond to at least one of the group consisting of a question and an answer;

a creating engine, comprising memory, to:

create a knowledge element in response to a user activating said marking element presented with said social networking interaction; and populate the knowledge element with information about:

the portion of the social networking interaction indicated as a question; and the portion of the social networking interaction indicated as an answer;

a storing engine, comprising memory, to store said knowledge element in a catalog of knowledge elements; and a recommending engine, comprising memory, to recommend the knowledge element for use in response to a user composing a message relevant to the knowledge element.

7. The system of claim 6, wherein the presenting engine to present an evaluation element for evaluating said knowledge element in said social networking interaction.

8. The system of claim 6, wherein the presenting engine to present an editing element for editing said knowledge element.

9. The system of claim 6, wherein said knowledge element includes at least one member of a group consisting of:

information about social networking users participating in said social networking interaction;

a number of submitter names;

a submission date; and a number of categories.

10. The system of claim 9, wherein a submitter name comprises a name of a person who marked at least one of said question specifier and said answer specifier.

11. The system of claim 10, wherein said person who marked at least one of said question specifier and said answer specifier is not a participant in said social networking interaction.

12. The system of claim 6, wherein question specifier indicates that said user found a message to include an inferred question.

13. The system of claim 6, wherein said knowledge element comprises a database field.

14. The system of claim 6, wherein said recommending engine is to recommend said knowledge element before said user shares said message within said social networking interaction.

15. The system of claim 6, further comprising a rating engine to rate said knowledge element based on a number of times said knowledge element has been referenced.

16. The system of claim 6, further comprising a categorizing engine to categorize said knowledge element by inferring a category through analysis of said social networking interaction.

17. The system of claim 6, wherein said recommending engine recommends said knowledge element based on said knowledge element category.

18. The system of claim 6, wherein said recommending engine recommends said knowledge element before said user shares said message within said social networking interaction.

* * * * *